United States Patent
Burch et al.

[15] 3,665,032
[45] May 23, 1972

[54] RESOLUTION OF L-DOPA INTERMEDIATE

[72] Inventors: Homer A. Burch; Thomas J. Schwan, both of Norwich, N.Y.

[73] Assignee: Morton-Norwich Products, Inc., Norwich, N.Y.

[22] Filed: Apr. 10, 1970

[21] Appl. No.: 27,438

[52] U.S. Cl............................................260/519, 260/999
[51] Int. Cl.......................................................C07c 101/08
[58] Field of Search.................................................260/519

[56] References Cited
UNITED STATES PATENTS 3,085,111  4/1963  Meltzer....................................260/519

*Primary Examiner*—Lorraine A. Weinberger
*Assistant Examiner*—Larnold Thaxton
*Attorney*—Bradford S. Allen

[57] ABSTRACT

A process is provided whereby DL-α-benzoylamino-4-hydroxy-3-methoxydihydrocinnamic acid is reacted with dehydroabietylamine to form the amine salt of Lα-benzoylamino-4-hydroxy-3-methoxydihydrocinnamic acid which upon treatment with hydrochloric acid and hydrobromic acid yields L-Dopa.

1 Claims, No Drawings

RESOLUTION OF L-DOPA INTERMEDIATE

This invention relates to a process for preparing L-Dopa. Particularly it is concerned with a process wherein DL-$\alpha$-benzoylamino-4-hydroxy-3-methoxydihydrocinnamic acid is converted to its L-dehydroabietylamine salt, that salt neutralized; and the L-$\alpha$-benzoylamino-4-hydroxy-3-methoxydihydrocinnamic acid hydrolyzed with hydrobromic acid to produce L-Dopa.

L-Dopa is a valuable agent in the treatment of Parkinson's disease. It is a naturally occurring amino acid and may be secured from natural sources. While such sources can be availed of to obtain it, the process is tedious and cumbersome. Synthetic methods for its production in facile and economical fashion are invariably beset with the necessity of resolving along the way or as a terminal step a racemic mixture to isolate the medicinally useful levo form.

One known synthetic route to L-Dopa involves the resolution of DL-$\alpha$-benzoylamino-3-hydroxy-4-methoxydihydrocinnamic acid, obtained from isovanillin via the azlactone method, with cinchonine followed by neutralization of the L-salt and its hydrolysis. When the more readily available raw material, vanillin, was subjected to the azlactone synthesis and the isomeric DL-$\alpha$-benzoylamino-4-hydroxy-3-methoxydihydrocinnamic acid obtained thereby treated with cinchonine, resolution was not effected.

According to the present invention it has been found that dehydroabietylamine, a relatively inexpensive and non-toxic chemical, is effective in accomplishing the resolution of DL-$\alpha$-benzoylamino-4-hydroxy-3-methoxydihydrocinnamic acid in good yield. The L-form obtained is readily converted to L-Dopa in conventional fashion.

In order that this invention may be readily available to and understood by those skilled in the art the following illustrative description is supplied:

Dehydroabietylamine (57 g., 0.20 mole) was dissolved in 450 ml. boiling methanol and a small amount of mechanical impurity was removed by filtration. The solution was heated to boiling and a solution of DL-$\alpha$-benzoylamino-4-hydroxy-3-methoxydihydrocinnamic acid (63 g., 0.2 mole) in 160 ml. boiling methanol was added. The solution was boiled and 113 ml. of boiling water was added (to turbidity). The mixture was allowed to cool gradually to room temperature and was stored at room temperature for 18 hours. The product, dehydroabietylamine salt of L-$\alpha$-benzoylamino-4-hydroxy-3-methoxydihydrocinnamic acid, was washed with two 125 ml. portions of methanol-water (4:1), air dried, and then dried at 60° to give 51 g. (83 percent) m.p. 223°–224°; $[\alpha]_D^{25°} = +50.30°$. An analytical sample was obtained after recrystallization from methanol = water (4 : 1): $[\alpha]_D^{25°} = +53.90°$.

Analysis Calculated for $C_{17}H_{17}NO_5 \cdot C_{20}H_{31}N$: C, 73.87; H, 8.44; N, 4.66.

Found: C, 73.97; H, 8.05; N, 4.66.

To a mixture of 3.85 g. (0.0064 mole) of the dehydroabietylamine salt of L-$\alpha$-benzoylamino-4-hydroxy-3-methoxydihydrocinnamic acid, 40 ml. water and 40 ml. ethyl acetate was added 3 ml. conc. HCl. The organic layer was separated and the aqueous layer was extracted with two 40 ml. portions of ethyl acetate. The combined organic layers were washed with 50 ml. water, dried (MgSO$_4$), and concentrated to dryness in vacuo to give 3.10 g. of the acid. To the acid was added 50 ml. 48% HBr. The mixture was stirred and refluxed for 2¼ hours, then allowed to stand at room temperature for 15 hours. The solid was filtered and washed with two 5 ml. portions of 48 % HBr. The filtrate and washings were combined and concentrated to dryness in vacuo. To the residue was added 10 ml. H$_2$O and a few drops of So$_2$/H$_2$O. The solution was warmed, decolorized, and filtered. The filtrate was cooled, adjusted to pH 5 (pH paper) with concentrated NH$_4$OH, and stored in the refrigerator for 2 days. The solid was filtered, washed with two 10 ml. portions of absolute ethanol, and air dried to give 0.52 g. (40 percent) of L-Dopa, $[\alpha]_D = -11.15°$.

What is claimed is:

1. In a process for preparing L-Dopa from DL-$\alpha$-benzoylamino-4-hydroxy-3-methoxydihydrocinnamic acid the step which comprises contacting said acid with dehydroabietylamine to form the dehydroabietylamine salt of L-$\alpha$-benzoylamino-4-hydroxy-3-methoxydihydrocinnamic acid followed by neutralization with hydrochloric acid and hydrolysis with 48 percent hydrobromic acid.

* * * * *

Notice of Adverse Decision in Interference

In Interference No. 98,244, involving Patent No. 3,665,032, H. A. Burch and T. J. Schwan, RESOLUTION OF L-DOPA INTERMEDIATE, final judgment adverse to the patentees was rendered Aug. 7, 1975, as to claim 1.

[*Official Gazette January 13, 1976.*]